United States Patent [19]

Setser

[11] Patent Number: 5,534,285

[45] Date of Patent: Jul. 9, 1996

[54] LOW CALORIE CHEMICALLY LEAVENED CAKES AND SURFACTANT SYSTEMS THEREFOR

[75] Inventor: Carole S. Setser, Manhattan, Kans.

[73] Assignee: Kansas State University Research Foundation, Manhattan, Kans.

[21] Appl. No.: 141,419

[22] Filed: Oct. 22, 1993

Related U.S. Application Data

[63] Continuation of Ser. No. 821,319, Jan. 13, 1992, abandoned, which is a continuation of Ser. No. 534,966, Jun. 8, 1990, abandoned, which is a continuation-in-part of Ser. No. 370,918, Jun. 23, 1989, abandoned.

[51] Int. Cl.$^6$ .................................................. A21D 10/04
[52] U.S. Cl. ........................ 426/552; 426/496; 426/523; 426/549; 426/555; 426/573; 426/653
[58] Field of Search .................................. 426/549, 552, 426/553, 555, 554, 804, 653, 654, 496, 520, 523, 551, 573

[56] References Cited

U.S. PATENT DOCUMENTS

| | | | |
|---|---|---|---|
| 3,379,535 | 4/1968 | Landfried et al. | 426/653 |
| 3,658,553 | 4/1972 | Modlove | 426/804 |
| 4,219,580 | 8/1980 | Torres | 426/549 |
| 4,242,366 | 12/1980 | Morgan et al. | 426/554 |
| 4,351,852 | 9/1982 | Rule et al. | 426/553 |
| 4,424,237 | 1/1984 | Wittman, III | 426/653 |
| 4,431,681 | 2/1984 | Hoyedus et al. | 426/553 |
| 4,668,519 | 5/1987 | Dartey et al. | 426/658 |
| 4,835,001 | 5/1989 | Mijac et al. | 426/556 |

OTHER PUBLICATIONS

Ebeler et al., Effects of Various Sucrose Fatty Acid Ester Emulsifiers on High–Ratio White Layer Cakes, Journal of Food Science, vol. 49 (1984), 380–383, 388.

American Heritage Dictionary, Second College Edition p. 321, 1982.

Emulsifier/Oil System for Reduced Calorie Cakes, Rasper et al. pp. 537–542, JAOCS, vol. 66, No. 4 (Apr. 1989).

*Primary Examiner*—Leslie Wong
*Attorney, Agent, or Firm*—Hovey, Williams, Timmons & Collins

[57] ABSTRACT

Reduced calorie, chemically leavened batters for the production of cake-type products are disclosed which incorporate preformed expanded liquid or gel mesophase emulsifier products so as to permit substantial reduction in high calorie components (e.g., shortening and sucrose) while giving organoleptically acceptable final cakes. The emulsifier products are preformed by initially mixing an emulsifier (preferably a polar and hydrophilic emulsifier such as a sucrose ester) with water, followed by optional heating and cooling to form the emulsifier product. The batters contain up to about 50% (flour weight basis) sweetening agent, which advantageously includes a high potency sweetener together with a minor amount of sucrose. A variety of bulking agents such as polydextrose can be used to give appropriate structure to the final cakes.

16 Claims, No Drawings

LOW CALORIE CHEMICALLY LEAVENED CAKES AND SURFACTANT SYSTEMS THEREFOR

This application is a continuation of application Ser. No. 07/821,319, filed Jan. 13, 1992, now abandoned, which is a continuation of Ser. No. 07/534,966, filed on Jun. 8, 1990, now abandoned, which is a continuation-in-part of Ser. No. 07/370,918, filed on Jun. 23, 1989, now abandoned.

BACKGROUND OF THE INVENTION

1. Field of the Invention

The present invention is concerned with reduced calorie, organoleptically acceptable cake products wherein substantial reductions in high calorie cake ingredients (e.g., shortening and sugar) are possible through incorporation of relatively minor amounts of expanded liquid or gel mesophase emulsifiers into the cake batters. More particularly, it is concerned with such cakes, and the starting batters, wherein sweetening agent is reduced to a maximum of about 50% (flour weight basis) and shortening is substantially if not entirely eliminated through use of an appropriate emulsifier system; bulking agents are also added to ensure appropriate cake structure.

2. Description of the Prior Art

In recent years, there has been a tremendous increase in public awareness of proper nutrition and its affect upon general health. As a consequence, consumers have increasingly sought reduced or low calorie foods. At the same time, however, most consumers will refuse reduced calorie foods if they do not substantially duplicate the taste and organoleptic qualities of their traditional high calorie counterparts.

The task of formulating reduced calorie foods which meets the dictates of consumer preference is a challenging one. Simple reduction of high calorie ingredients may result in loss of appearance, flavor and texture.

Traditional premium, rich, layer cakes of the high-ratio variety (i.e., with a sugar content of, e.g., 100–135% flour weight basis and substantial shortening) have a caloric value ranging from about 350–500 Calories per 100 g. of cake. Thus, while cakes of this character are deemed delicious to contemporary tastes, they can be a substantial factor in unwanted obesity.

Significant efforts have been made in the past towards development of reduced caloric cakes. Most of these efforts have involved attempts at using substitute materials in lieu of ingredients such as shortening, eggs and sugar. For the most part though, this prior work has not really satisfied the demand for an organoleptically acceptable cake product having substantially reduced caloric content.

One difficulty associated with reduced calorie cake development is that different types of cakes develop structure in very different ways. Thus, sponge cakes on the one hand have substantial egg content and the egg protein matrix is used to entrap air during batter formulation. Layer type cakes on the other hand generally have lesser egg content, and do not depend solely on an aerated egg fraction. As a consequence, a particular system or formula used in sponge cakes for calorie reduction may be totally inapplicable in the context of layer-type cakes.

U.S. Pat. No. 4,424,237 describes hydrated emulsifiers for use in flour based baked goods. The emulsifier products described in this patent include a combination of known emulsifiers, present at relatively high levels; correspondingly, the water content of these emulsifier products is lowered. In the examples set forth in this patent, the water content of the emulsifier compositions range from 59.1 to 88.57%. Although this patent mentions the goal of calorie reduction, the anticipated level of reduction is less than desirable.

U.S. Pat. No. 4,668,519 describes reduced calorie cookies of specialized composition. However, those skilled in the art recognize that cookie doughs are relatively low water compositions which are distinctly different than aerated cake batters.

Accordingly, there is a real and unsatisfied need in the art for reduced calorie cake products which meet the demand for consumers for pleasing taste, texture and eye appeal.

SUMMARY OF THE INVENTION

The present invention overcomes the problems outlined above and provides improved reduced calorie aerated cake batters and resultant cakes of high quality. Broadly speaking, the invention provides a method of preparing a reduced calorie, chemically leavened cake batter wherein an expanded liquid or gel mesophase emulsifier product is preformed by mixing quantities of an appropriate emulsifier and water, followed by optional heating and cooling of the mixture to form the additive emulsifier product. The preformed emulsifier product is then mixed with other cake batter ingredients including flour, chemical leavening agent and bulking and sweetening agents. The sweetening agent is limited to a maximum of about 50% (flour weight basis) in the batter, more preferably from about 0.1 to 50% (flour weight basis) and most preferably from about 5 to 40% (flour weight basis).

The batter ingredients are then subjected to significant mixing so as to assure an even dispersion of the ingredients and to give the resultant cake the desired structure.

A variety of emulsifiers can be used in accordance with the present invention but preferably the emulsifiers are polar and hydrophilic. Non-limiting examples of emulsifiers are sucrose esters, distilled monoglycerides, mono-and diglycerides, lecithin, polysorbate 60, polyglycerol, the stearoyl lactylates, and mixtures thereof. The expanded liquid or gel mesophase emulsifier products is added to the batter in such amount as to provide an emulsifier content in the batter of from about 0.5 to 4%, and more preferably from about 1.5 to 2.5% (flour weight basis).

Various optional ingredients can also be employed in the cake batters of the invention, such as salt, flavorings, gums, shortening (in reduced amounts), egg and milk proteins (e.g., casein or whey protein concentrate), and mixtures thereof.

Cakes in accordance with the invention exhibit substantially reduced caloric values e.g., up to about 200 Calories per 100 g. of cake, and more preferably from about 100–200 Calories per 100 g. of cake.

DESCRIPTION OF THE PREFERRED EMBODIMENTS

The expanded liquid or gel mesophase emulsifier products useful in the cake batters of the present invention are typically made by initial mixing of an emulsifier and water, followed by optional heating and subsequent cooling. In this regard, it is preferred to heat the water-emulsifier mixture, but sufficient energy input to the system may be achieved through intense mixing, so as to eliminate the need for heating. The resultant emulsifier products would typically include from about 96 to 99% by weight water, and more preferably about 97.5 to 98.5% by weight water, although more concentrated compositions could also be used. Correspondingly, emulsifier product would comprise from about 1 to 4% by weight emulsifier, and more preferably from about 1.5 to 2.5% by weight thereof.

The water-emulsifier mixtures which are subjected to a heating step are heated until they achieve a noticeable thickening, which involves heating to a temperature from about 40° to 80° C. The mixture may be periodically stirred during the heating process. When the thickened mixtures are allowed to cool to approximately ambient temperature, an expanded liquid or gel mesophase is formed. This product is stable in a final batter to assist in formation of desirable bubble foams.

As indicated above, a variety of emulsifiers can be used in the present invention. Two particularly preferred emulsifiers, however, are the sucrose esters and emulsifiers containing monoglycerides. Commercially available emulsifiers of this character are the VANALL and F-160 emulsifiers. The VANALL product is a hydrated blend of sorbitan monostearate, mono and diglycerides, and polysorbate 60. The product is commercialized by Patco Products of Kansas City, Mo., and is known to be useful in shortening-type and sponge cakes. It is a creamy white soft plastic paste having a saponifaction value of 45–55, and iodine value of 1.5% maximum, 70% maximum volatiles, and a pH of 4.5–5.0. Under law, it may be used up to 3.1% of the dry weight of finished chemically leavened cake products.

The F-160 sucrose ester emulsifier is commercialized by Dai-Ichi Kogyo Sciaku Co. and is a nonionic sucrose fatty acid ester emulsifier derived from pure sugar and tallow. The product contains about 70% monoester, and about 30% di-, tri-, and polyesters. It has an HLB value of about 15, and the fatty acid composition is approximately 70% stearates and 30% palmitates. The F-160 emulsifier is in powder form, has an acid value of not more than 5, and a free sucrose content of not more than 10%.

Another type of useful emulsifier is the Alphadim 90SBK monoglycerides. Alphadim 90SBK is commercialized by American Ingredients Co. of Kansas City, Mo., and is a high purity monoglyceride prepared from fully hydrogenated soy oil and glycerine. It is a white to cream colored fine bead and has a saponification value of 150–165, an iodine value of less than 3 and a 90% minimum alpha ester content. In practice, this emulsifier is neutralized by using water having sufficient base therein to give a pH of 8–9 in the preparation of the preformed emulsifier of the present invention.

The expanded liquid or gel mesophase emulsifier products of the invention are employed in an amount to give the resultant batter an emulsifier content of from about 0.5 to 4%, and more preferably from about 1.5 to 2.5% (flour weight basis).

In preferred batter formulation procedures, most (e.g., 60 to 100% by weight), if not all, of the ultimate water content of the batter is derived from the preformed emulsifier products. In particular, the moisture content of the batter is variable depending upon the desired characteristic of the final cake product. However, the water content of the batter would generally range from about 100 to 200% (flour weight basis).

The sweetening agent fraction of the batters of the invention can be derived from a wide variety of sources. For example, use can be made exclusively of high potency sweeteners such as heat-encapsulated aspartame, acesulfame K, cyclamates, chlorinated sugars (sucralose), L-sugars, dipeptides (alitame), thaumatin and mixtures thereof. In such cases, the sweetening agent level would be very low, typically on the order of 2 to 7% (flour weight basis) in the batter. Normally, such usage would also require provision of bulking agents for structure in the cake, and these can be selected from the group consisting of sorbitol, lactitol, polydextrose, maltodextrose, fluffy cellulose, maltitol, mixtures of -D-glucopyranosyl- 1, 6-mannitol and -D-glucopyranosyl-1, 6-sorbitol, mixtures of sorbitol and hydrogenated saccharides, cellulosic or hemicellulosic agents, modified carbohydrate and mixtures thereof. Typically, such bulking agents would be present at a level of up to about 96% (flour weight basis) in the batters, and more preferably from about 50 to 95% (flour weight basis) when sweetening is accomplished strictly through the use of high potency sweeteners.

In other instances, sweetening can be derived from multiple sources, such as through a combination of sucrose, fructose, other carbohydrate sweeteners and a high potency sweetener, or by use of certain types of bulking agents with specific sweeteners. As little as 5% (flour weight basis) sucrose along with an appropriate quantity of high potency sweetener can in some cases give improved cakes. In such cases the quantity of bulking agents employed would correspondingly be reduced. For example, in batters making use of small quantities of sucrose, the bulking agents may comprise a combination of maltodextrin (having a DE of less than 20), polydextrose, maltitol, Palatinit (a commercial product consisting of an eqimolar mixture of $\alpha$-D-glucopyranosyl- 1, 6-mannitol and $\alpha$-D-glucopyranosyl-1, 6-sorbitol) and Lycasin (a commercial product comprising 76 to 88% sorbitol, hydrogenated di-, tri- to hexasaccharides, and 15 to 23% hydrogenated higher saccharides).

As indicated previously though, the level of sweetening agent should not exceed about 50% (flour weight basis) in the batter, and more preferably from about 0.1 to 50% (flour weight basis), most preferably from about 5 to 40% (flour weight basis) therein. Sweetening agent usage above this level would normally involve use of substantial quantities of high calorie sweeteners such as sucrose with the result that the aims of the invention would be substantially frustrated.

The chemical leavening agent used in the batters of the invention is not critical, but preferably a conventional double acting baking powder is employed, typically at a level of from about 5 to 12% (flour weight basis).

While the goal of calorie reduction dictates minimization of high calorie ingredients, organoleptic properties may be substantially enhanced through provision of relatively small amounts of ingredients such as shortening at a level up to about 10% (flour weight basis). Other options include gums such as xanthan gum (0.01 to 1.0%), whey protein concentrate (0.01 to 20%), and flavorings such as vanilla extract (1 to 7%), wherein all of the foregoing percentages are on a flour weight basis.

The cake batters of the present invention also normally contain whole eggs, although such is not absolutely essential. When eggs are used, the level of incorporation is from about 5 to 90%, and more preferably from about 30 to 75% (flour weight basis).

The following Examples set forth presently preferred yellow cake formulations in accordance with the invention. It should be understood that the examples are illustrative in nature, and should not be considered as limiting the overall scope of the invention.

EXAMPLE 1

A dry, less fragile yellow cake in accordance with the present invention was made using the following ingredients:

| Ingredient | Wt. g. | %, fwb. |
| --- | --- | --- |
| Cake flour (Pillsbury Sno-Sheen) | 145.0 | 100.0 |
| Double Acting Baking Powder | 14.2 | 9.8 |
| Salt | 3.2 | 2.2 |
| Maltodextrin (DE 18) | 24.0 | 16.6 |
| NutraSweet Encapsulated Aspartame | 5.0 | 3.4 |
| Vanilla Extract | 6.0 | 4.1 |
| Xanthan Gum | 0.1 | 0.07 |
| Whey Protein Concentrate | 15.0 | 10.3 |
| Polydextrose | 102.0 | 70.3 |
| Water | 196.0 | 135.0 |
| Vanall Emulsifier | 2.2 | 1.5 |
| Whole Egg | 66.0 | 45.5 |

The water and emulsifier are first mixed and heated until a phase change occurs, about 50° C. The emulsifier-water mixture is allowed to cool to ambient temperature and forms an expanded liquid or gel mesophase emulsifier product.

All other dried ingredients are mixed at speed 2 of a Kitchen Aid 5C mixer for one minute. All other ingredients, including the emulsifier gel, are added to the dry ingredients, with further mixing at speed 2 for 30 seconds. The mixing bowl is then scraped, with subsequent mixing at speed 10 for two minutes. The bowl is then scraped, followed by further mixing at speed 10 for an additional 2 minutes. 400 g. of the resultant aerated foam batter is then poured into an 8 inch round layer cake pan, followed by baking at 350° F. for 35–40 minutes.

The resulting cake has an approximate calculated caloric value of 168 Calories per 100 g. of cake. The cake exhibited a volume index (AACC Method 10-91) of approximately 120. The cake had very acceptable organoleptic qualities.

EXAMPLE 2

A dry, slightly moist and fragile yellow cake was made using the following ingredients:

| Ingredient | Wt. g. | %, fwb. |
| --- | --- | --- |
| Cake flour (Pillsbury Sno-Sheen) | 145.0 | 100.0 |
| Double Acting Baking Powder | 14.2 | 9.8 |
| Salt | 3.2 | 2.2 |
| Maltodextrin (DE 18) | 24.0 | 16.6 |
| NutraSweet Encapsulated Aspartame | 5.0 | 3.4 |
| Vanilla Extract | 6.0 | 4.1 |
| Xanthan Gum | 0.1 | 0.07 |
| Whey Protein Concentrate | — | — |
| Polydextrose | 85.0 | 58.6 |
| Water | 150.0 | 103.4 |
| F-160 Sucrose Ester Emulsifier | 2.2 | 1.5 |
| Whole Egg | 91.0 | 62.8 |

The cake was made exactly as described in Example 1, giving a volume index of 137 and an approximate calculated caloric value of 178 Calories per 100 g. of cake. The organoleptic properties were acceptable.

EXAMPLE 3

This cake was excellent texture-wise but mouth-drying was noted and flavor was less good.

| Ingredient | Wt. g. | %, fwb |
| --- | --- | --- |
| Cake flour (Pillsbury Sno-Sheen) | 150.0 | 100.0 |
| Double Acting Baking Powder | 14.7 | 9.8 |
| Salt | 3.3 | 2.2 |
| Xanthan Gum | 0.38 | 0.25 |
| Whey Protein Concentrate | 12.5 | 8.3 |
| Whole Fresh Egg | 58.5 | 39.0 |
| Polydextrose | 63.8 | 42.5 |
| Water | 195.0 | 130.0 |
| Sucrose Ester F-160 Emulsifier | 3.75 | 2.5 |
| Lycasin | 67.5 | 45.0 |
| Acesulfame K | 0.38 | 0.25 |

The cake was prepared as in Example 1. Volume index was 101; approximate caloric value was 184/100 g. cake.

EXAMPLE 4

This cake was a very fine and even one of the highest quality cakes.

| Ingredient | Wt. g. | %, fwb |
| --- | --- | --- |
| Cake flour (Pillsbury Sno-Sheen) | 150.0 | 100.0 |
| Double Acting Baking Powder | 14.7 | 9.8 |
| Salt | 3.3 | 2.2 |
| Xanthan Gum | 0.38 | 0.25 |
| Whey Protein Concentrate | 12.5 | 8.3 |
| Whole Fresh Egg | 58.5 | 39.0 |
| Polydextrose | 67.5 | 45.0 |
| Water | 195.0 | 130.0 |
| Sucrose Ester F-160 Emulsifier | 3.0 | 2.0 |
| Sucrose | 41.6 | 27.7 |
| Lycasin | 26.0 | 17.3 |
| Acesulfame K | 0.38 | 0.25 |

The cake was prepared as in Example 1. Volume index was 102; approximate caloric value was 181/100 g. cake.

EXAMPLE 5

Cake with excellent fine, even cell structure; slightly moist; not too fragile, one of the best cakes.

| Ingredient | Wt. g. | %, fwb |
| --- | --- | --- |
| Cake flour (Pillsbury Sno-Sheen) | 150.0 | 100.0 |
| Double Acting Baking Powder | 14.7 | 9.8 |
| Salt | 3.3 | 2.2 |
| Xanthan Gum | 0.38 | 0.25 |
| Whey Protein Concentrate | 12.5 | 8.3 |
| Whole Fresh Egg | 58.5 | 39.0 |
| Polydextrose | 60.0 | 40.0 |
| Water | 195.0 | 130.0 |
| Sucrose Ester F-160 Emulsifier | 3.0 | 2.0 |
| Sucrose | 67.5 | 45.0 |
| Acesulfame K | 0.38 | 0.25 |

The cake was prepared as in Example 1. Volume index was 105; approximate caloric value was 182/100 g. cake.

I claim:

1. A reduced calorie, chemically leavened cake batter, consisting essentially of:

respective amounts of flour, egg and chemical leavening agent;

an amount, up to about 96% (flour weight basis) of bulking agent selected from the group consisting of sorbitol, lactitol, polydextrose, maltodextrose, maltitol, cellulosic or hemicellulosic agents, and mixtures thereof;

an amount, up to about 50% (flour weight basis) of a sweetening agent, including individual quantities of a first sweetening agent selected from the group consisting of sucrose and fructose, and a second sweetening agent selected from the group consisting of aspartame, acesulfame K, cyclamates, chlorinated sugars, L-sugars, dipeptides, thaumatin and mixtures thereof; and a quantity of preformed expanded liquid or gel mesophase emulsifier product consisting essentially of water and sucrose ester emulsifier, said sucrose ester emulsifier containing a mixture of monoester and di-, tri- and polyesters with the amount of monoester being greater than the total amount of di-, tri- and polyesters therein, said emulsifier product being present in the batter at a level to give the batter an emulsifier content of from about 0.5 to 4% (flour weight basis), said batter, upon collection and baking thereof to form a cake product, giving a cake product having a caloric value of up to about 200 Calories per 100 g. of cake product, said batter being aerated and having a water content of from about 100 to 200% (flour weight basis).

2. The cake batter of claim 1, said emulsifier product including an additional emulsifier selected from the group consisting of monoglycerides, diglycerides, lecithin, polysorbate 60, polyglycerol, the stearoyl lactylates, and mixtures thereof.

3. The cake batter of claim 1, said emulsifier content being from about 1.5 to 2.5% (flour weight basis).

4. The cake batter of claim 1, said emulsifier product being formed by mixing of said water and emulsifier.

5. The cake batter of claim 1, said chemical leavening agent being present at a level from about 5 to 12% (flour weight basis).

6. The cake batter of claim 1, including from about 5 to 90% (flour weight basis) eggs.

7. The cake batter of claim 6, said eggs being present at a level from about 30 to 75% (flour weight basis).

8. The cake batter of claim 1, said sweetening agent being present at a level from about 5 to 40% (flour weight basis).

9. The cake batter of claim 1, including ingredients selected from the group consisting of salt, flavorings, gums, shortening and milk proteins, and mixtures thereof.

10. A reduced calorie, chemically leavened cake prepared from the batter of claim 1.

11. The cake batter of claim 1, said sucrose ester emulsifier containing up to about 30% by weight of said di-, tri- and polyesters.

12. The cake batter of claim 1, said sucrose ester emulsifier containing about 70% by weight of said monoester and about 30% by weight of said di-, tri-, and polyesters.

13. A reduced calorie, chemically leavened cake batter, comprising:

respective amounts of flour, egg and chemical leavening agent;

an amount, up to about 96% (flour weight basis) of bulking agent selected from the group consisting of sorbitol, lactitol, polydextrose, maltodextrose, maltitol, cellulosic or hemicellulosic agents, and mixtures thereof;

an amount, up to about 50% (flour weight basis) of a sweetening agent, including individual quantities of a first sweetening agent selected from the group consisting of sucrose and fructose, and a second sweetening agent selected from the group consisting of aspartame, acesulfame K, cyclamates, chlorinated sugars, L-sugars, dipeptides, thaumatin and mixtures thereof; and a quantity of preformed expanded liquid or gel mesophase emulsifier product consisting essentially of water and sucrose ester emulsifier, said sucrose ester emulsifier containing a mixture of monoester and di-, tri- and polyesters with the amount of monoester being greater than the total amount of di-, tri- and polyesters therein, said emulsifier product being present in the batter at a level to give the batter an emulsifier content of from about 0.5 to 4% (flour weight basis), said batter, upon collection and baking thereof to form a cake product, giving a cake product having a caloric value of up to about 200 Calories per 100 g. of cake product, said batter being aerated and having a water content of from about 100 to 200% (flour weight basis).

14. The cake batter of claim 13, said sucrose ester emulsifier containing up to about 30% by weight of said di-, tri- and polyesters.

15. The cake batter of claim 13, said sucrose ester emulsifier containing about 70% by weight of said monoester and about 30% by weight of said di-, tri-, and polyesters.

16. A method of preparing a reduced calorie, chemically leavened cake batter, comprising the steps of:

forming an expanded liquid or gel mesophase emulsifier product by mixing a quantity of emulsifier product with a quantity of water, and forming the emulsifier product therefrom, said emulsifier product consisting essentially of water and sucrose ester emulsifier, said sucrose ester emulsifier containing a mixture of mono and di-, tri- and polyesters with the amount of monoester being greater than the total amount of di-, tri-, and polyesters therein;

mixing an amount of emulsifier product with cake batter ingredients including respective amounts of flour, egg and chemical leavening agent; an amount of up to about 96% (flour weight basis) bulking agent selected from a group consisting of sorbitol, lactitol, polydextrose, maltodextrose, maltitol, cellulosic or hemicellulosic agents, and mixtures thereof; an amount of up to 50% (flour weight basis) of a sweetening agent selected from the group consisting of sucrose and fructose, and a second sweetening agent selected from a group consisting of aspartame, acesulfame K, cyclamates, chlorinated sugars, L-sugars, dipeptides, thaumatin, and mixtures thereof; said emulsifier product being present in the batter at a level to give the batter an emulsifier content of from about 0.5 to 4% (flour weight basis);

said batter being intimately mixed and aerated and having a water content of from about 100 to 200% (flour weight basis); and baking said batter to form a cake product having a caloric value of up to about 200 calories per 100 g of cake product.

\* \* \* \* \*